July 21, 1959 R. W. BRANDT 2,896,077
CLIPPER CIRCUIT
Filed April 24, 1953
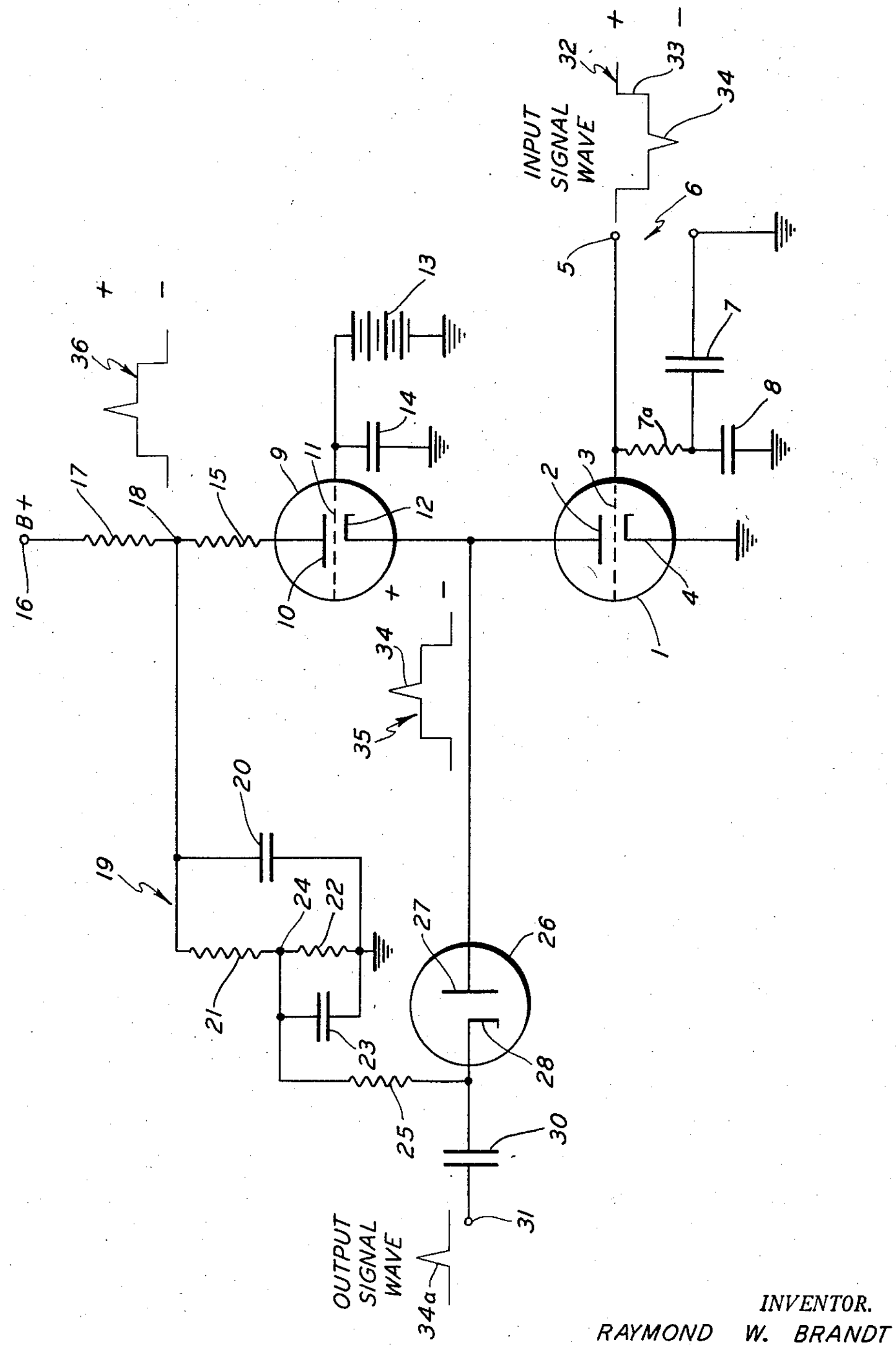
INVENTOR.
RAYMOND W. BRANDT
BY
Lockwood, Galt, Woodard, & Smith
ATTORNEYS United States Patent Office 2,896,077 Patented July 21, 1959

2,896,077

CLIPPER CIRCUIT

Raymond W. Brandt, Janesville, Wis., assignor to International Telephone and Telegraph Corporation, a corporation of Maryland Application April 24, 1953, Serial No. 350,956

8 Claims. (Cl. 250—27)

The present invention relates to a circuit for separating two components of a composite signal in which one of the components is superimposed on the other of the components. This circuit may be conveniently characterized as a clipper circuit which serves to separate two simultaneously occurring signals by distinguishing between the amplitudes of the two signals.

In certain electronic circuits, particularly shaped impulses of signal energy are used for predetermined purposes. Among the wave shapes of impulses conventionally utilized is the one in which the impulse occurs at a predetermined, constant rate and which is composed of two components, one component being a square wave which may be characterized as a "pedestal," and the other part being a high frequency impulse or "pip" which is superimposed on the pedestal between the leading and trailing edges thereof.

In certain electronic applications, the only portion of this composite signal which is desired to be used is the "pip" portion, and in accordance with this disideratum, circuits have been devised for the purpose of separating the pip from the pedestal. Difficulties have been encountered in the use of these separating circuits by reason of the fact that the amplitude of the pedestal varies from impulse to impulse, with the result that the output signal wave sometimes includes the upper portion of the pedestal and other times cuts off a portion of the bottom of the pip.

It is therefore an object of this invention to provide a separating circuit which operates independently of the amplitude of the pedestal and which therefore will sever the full height of the pip from the pedestal regardless of succeeding variations in pedestal height.

It is another object of this invention to provide a dynamic signal separation circuit which is sensitive to successively varying wave shapes of an input signal and which is operative to separate two simultaneously occurring signals which have different amplitudes.

It is still another object of this invention to provide a signal separation circuit operative to separate two simultaneously occurring signal components and which is responsive to one of the signal components to generate a control voltage which is utilized to separate the other component therefrom.

In accordance with the present invention, it is proposed to provide an amplitude sensitive, signal separating circuit incorporating essentially four circuit networks. These four networks comprise a first normally conductive vacuum tube having an anode which is connected to the cathode of a vacuum tube used in a grounded-grid amplifier. The anode circuit of the grounded-grid amplifier is connected to a voltage integrating circuit which serves to develop a D.C. voltage from periodically occurring impulses produced by the amplifier. A diode, having an anode and a cathode is coupled in between the integrating circuit and the anode of the first tube, the D.C. voltage being impressed upon the diode cathode for the purpose of determining the value of signal voltage which must be impressed on the diode anode before the diode will conduct a current therethrough.

For a better understanding of the invention, together with other and further objects thereof, reference is made to the following description, taken in connection with the accompanying drawing, and the scope of the invention will be defined in the appended claims.

In the accompanying drawing:

The figure is a diagrammatic illustration of one circuit embodiment of this invention.

Referring to the drawing, a first tube 1 having an anode 2, a control grid 3, and a cathode 4, constitutes a portion of a signal input circuit of the aforementioned embodiment, and has its control grid 3 connected to a terminal 5 of an input circuit generally indicated by the reference numeral 6. The cathode 4 is grounded, and series connected terminating resistor *7a* and bias battery 8 are connected between the grid 3 and ground, the positive terminal of the battery 8 being grounded. A coupling capacitor 7 is connected between the juncture of the resistor *7a* and the battery 8 and ground. The voltage of the battery is of such value as to allow the tube 1 to conduct a space current corresponding to the wave shape of a signal applied to the input circuit 6.

Another tube 9, having an anode 10, control grid 11, and cathode 12, is connected in "cascade" with the tube 1 (that is, the cathode 12 of the tube 9 is connected to the anode 2 of the tube 1), and has a source 13 of positive biasing potential connected between the grid 11 and and ground. A by-pass condenser 14 is also connected between grid 11 and ground.

An anode resistor 15 connects a source of anode potential 16 to the anode 10, and is preferably a part of a voltage dividing circuit comprising the resistor 15 and a series connected resistor 17. The juncture 18 of the two resistors 15 and 17 is connected to an integrating circuit generally indicated by the reference numeral 19, this integrating circuit comprising a relatively large condenser 20 which is connected between the point 18 and ground, and two series connected resistors 21 and 22 which are bridged across the terminals of the condensers 20. Another relatively large condenser 23 is connected in parallel with the resistor 22 for a purpose which will become apparent hereafter.

The juncture 24 of the two resistors 21 and 22 is coupled into the output circuit of the illustrated embodiment by means of the coupling resistor 25.

A diode or similar type of unidirectional current conducting device 26, has the anode, or positive electrode, 27, connected to the anode 2 of the tube 1. The cathode, or negative electrode 28, is connected to the bottom end of the coupling resistor 25. A coupling capacitor 30 connected to the cathode 28 may be considered as a part of the output circuit, since it serves the function of coupling the signal passed by the diode 26 to an output terminal 31.

A typical composite input signal of the type mentioned earlier is generally indicated by the reference numeral 32 and comprises a square wave pedestal 33 and a pip 34 which is superimposed on the pedestal 33. As explained in the foregoing, it is one object of this invention to separate the pip 34 in its entirety from the pedestal 33, this pip 34 then appearing at the output terminal 31.

In the illustrated arrangement, the impulse 32 is shown as being of negative polarity, whereupon the corresponding signal which appears in the anode circuit 2 of the tube 1 will appear as the wave 35 of positive polarity.

In operation, when the signal 32 is applied to the control grid 3 of the tube 1, the wave 35 is produced by the tube 1 and is simultaneously applied to the cathode 12 of the tube 9 and the anode 27 of the diode 26. The value of the bias source voltage 13 is such as will cause the circuit of the tube 9 to act as a grounded-grid amplifier which produces an amplified signal 36 corresponding in shape to both of the signals 32 and 35. This signal 36 is applied to the integrating circuit 19 whereupon the condenser 20 assumes a charge proportional to the magnitude of the signal 36, and the coupling resistor 25 connects a portion of this charge, which appears as a D.C. voltage, from the voltage dividing network 21, 22 to the cathode 28 of the diode 26. By this arrangement, a D.C. potential of positive polarity is applied to the cathode 28 which serves to establish the minimum positive potential which may be applied to the anode 27 for causing the tube 26 to conduct a space current.

The circuit parameters and tube constants are so selected, especially those of the integrating circuit 19, that the D.C. voltage derived from the juncture 24 of the network 21, 22 equals in value the peak voltage of the pedestal component of the wave 35. Under this voltage condition, the tube 26 will be non-conductive until a positive potential exceeding the value of the voltage applied to the cathode 28 is impressed upon the anode 27. Since the D.C. voltage applied to the cathode 28 is equal to the peak value of the pedestal component of the wave 35, it is seen that the pip portion 34 of the composite wave will have a magnitude exceeding the cathode voltage and will be conducted by the tube 26 to appear at the terminal 31 as a single pulse or pip **34*a***.

In the operation of the foregoing circuit, the pip signal appearing in the composite wave is of such short duration that it contains negligible energy so as to have little or no effect on the average voltage appearing in the integrating circuit 19. The voltage appearing in the anode circuit of the tube 9 possesses the same polarity as the signal applied to the cathode 12, and since this anode 10 signal voltage is suitably amplified, the resultant amplified impulses are effectively averaged by the integrating circuit 19 so as to provide a substantially steady-state D.C. potential. The resistor network 21, 22 is used to scale down this D.C. potential appearing over the condenser 20 to the value which corresponds to the peak value of the pedestal in wave 35. Now, since the value of the D.C. potential developed by the integrating circuit 19 is a function of the pedestal portion (of long duration) of the wave 36, it is seen that this D.C. voltage will vary in magnitude in accordance with the fluctation in amplitude of the wave 36. This fluctuation of the wave 36 is caused by and will follow identically, the variations in the input signal wave 32. Since the voltage developed by the integrating circuit 19 in dynamic in character; that is to say, it varies in value directly proportional to the changing amplitude of the pedestal of the wave 36, the cathode 28 will have applied thereto a voltage which will correspond identically to the peak value of the pedestal wave 35 which is applied to the anode 27. Thus, the entire pip 34, and only this pip, is effectively clipped from the top side of the pedestal even though the pedestal amplitude of the input wave 32 varies.

While it will be understood that the circuit specifications of the clipping circuit of this invention may vary according to the design for any particular application, the following circuit specifications for a clipping circuit are included by way of example only, as suitable for separating the components of a signal such as the signal 32.

| Reference numeral: | Part type or value |
|---|---|
| Tube **1** | 1/2 12AT7 |
| Condenser **7** | mfd__ 0.10 |
| Resistor **7*a*** | ohms__ 100 |
| Tube **9** | 1/2 12AT7 |
| Condenser **14** | mfd__ 0.10 |
| Res. **15** | ohms__ 5600 |
| Res. **17** | do__ 12,500 |
| Condenser **20** | mfd__ 0.5 |
| Res. **21** | megohms__ 1.8 |
| Res. **22** | do__ 1 |
| Condenser **23** | mfd__ 0.5 |
| Res. **25** | ohms__ 22,000 |
| Tube **26** | 1/2 6AL5 |
| Condenser **30** | mfd__ 0.001 |

While there has been described what is at present considered a preferred embodiment of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A circuit for separating two components of a composite signal, one component being superimposed on the other component and having a period substantially smaller than said other component; comprising a first circuit which conducts a composite signal in accordance with the wave form thereof, a second normally conductive circuit coupled to said first circuit and operative to conduct a current in accordance with the wave form of said composite signal, and an integrating circuit coupled to said second circuit and operative to produce an average voltage which corresponds to the peak voltage of said other composite signal component, a third circuit coupled to said first circuit and to said integrating circuit and including a unidirectionally conducting device having at least two terminals, said average voltage having a polarity whereby when applied to one of said terminals the conduction characteristics of said device is determined, the signal voltage produced by said first circuit corresponding to said composite signal, this first circuit signal being applied to the other of said terminals whereby said device conducts in accordance with that portion of said first circuit signal which exceeds the magnitude of said average voltage.

2. A circuit for separating two components of a composite signal, one component being superimposed on the other component and having a period substantially smaller than said other component; comprising a first circuit which conducts a composite signal in accordance with the wave form thereof, a second normally conductive circuit coupled to said first circuit and operative to conduct a current in accordance with the wave form of said composite signal, and an integrating circuit coupled to said second circuit and operative to produce an average voltage which corresponds to the peak voltage of said other composite signal component, a third circuit coupled to said first circuit and to said integrating circuit and including a diode device having a cathode and an anode, said average voltage having a positive polarity and being applied to said cathode thereby determining the conduction characteristics of said diode, the signal voltage produced by said first circuit corresponding to said composite signal and having a positive polarity, this first circuit signal being applied to said anode whereby said diode conducts in accordance with that portion of said first circuit signal which exceeds the magnitude of said average voltage.

3. A circuit for separating two components of a composite signal, one component being superimposed on the other component and having a period substantially smaller than said other component; comprising a first circuit which includes a first electron discharge device having a first control electrode, said device conducting a current in accordance with the wave form of said composite signal applied to said first control electrode, a second circuit coupled to said first circuit and including a second electron discharge device having a second control electrode, said second device conducting a current in accordance with the wave form of a signal produced by said first circuit and operatively coupled to said second control electrode, an integrating circuit coupled to said second circuit and responsive to the signal produced by the latter to generate a positive direct current voltage having a value proportional to the value of the second circuit signal, and a third electron discharge device having an anode and a cathode, said cathode being coupled to said integrating circuit whereby said direct current voltage is impressed on said cathode, and said anode being coupled to said first circuit whereby the first circuit signal is impressed on said anode, said third electron discharge device conducting only that part of said first circuit signal having a voltage value which exceeds the value of said average voltage.

4. A circuit for separating two components of a composite signal, one component being superimposed on the other component and having a period substantially smaller than said other component; comprising a first circuit which includes a first electron discharge device having a first control electrode, said device conducting a current in accordance with the wave form of said composite signal applied to said first control electrode, a second circuit coupled to said first circuit and including a second electron discharge device having a second control electrode, said second device conducting a current in accordance with the wave form of a signal produced by said first circuit and applied to said second control electrode, an integrating circuit comprising a resistance connected in parallel with a capacitance, said integrating circuit being coupled to said second circuit and being responsive to the signal produced by the latter to generate a positive direct current voltage having a value as determined by said parallel connected resistance and capacitance, and a third electron discharge device having an anode and a cathode, said cathode being coupled to said integrating circuit whereby said direct current voltage is impressed on said cathode, and said anode being coupled to said first circuit whereby the first circuit signal is impressed on said anode, said third electron discharge device conducting only that part of said circuit signal having a voltage value which exceeds the value of said average voltage.

5. A circuit for separating two components of a composite signal, one component being superimposed on the other component and having a period substantially smaller than said other component; comprising a normally conductive first tube having a cathode, an anode, and a control grid, said cathode being connected to ground, a normally conductive second tube having a cathode, an anode, and a control grid, the first tube anode being connected to the second tube cathode, a capacitor connecting said second tube grid to ground, said first tube being operative to conduct said composite signal as applied to the first tube grid, a source of anode potential connected to said second tube anode, a direct current voltage-developing network comprising a resistance connected in parallel with a capacitance, said network having one end conductively coupled to the second tube anode and having the other end connected to ground, and a diode having a cathode and an anode, the diode anode being connected to the first tube anode, and the diode cathode being conductively connected to said network whereby a direct current voltage developed by said network from the signal produced by said second tube will limit the conduction of only a portion of the first tube signal by said diode as determined by the relationship between the magnitudes of said direct current voltage and the voltage of said first tube signal.

6. A circuit for separating two components of a composite signal, one component being superimposed on the other component; comprising an amplifier having an input circuit and an output circuit, circuit means for applying said composite signal to said amplifier input circuit, an integrating network coupled to said amplifier output circuit, and a unidirectionally conductive device coupled between said network and said amplifier input circuit whereby said composite signal is applied to one side of said device and the voltage from said network is applied to the other side of said device.

7. A circuit for separating two components of a composite signal, one component being superimposed on the other component; comprising an amplifier having an input circuit and an output circuit, circuit means for applying said composite signal to said amplifier input circuit, an integrating network coupled to said amplifier output circuit, a diode having an anode and cathode, the anode being coupled to said amplifier input circuit and the cathode being coupled to said network, said cathode providing an output circuit from which said one signal component may be obtained.

8. A circuit for separating two components of a composite signal, one component being superimposed on the other component; comprising an amplifier having control and output signal electodes, means for applying said composite signal to said control electrode, an integrating network coupled to said output signal electrode for producing a unidirectional potential corresponding to the amplitude of said composite signal, and a diode operatively coupled between said network and said control electrode whereby said composite signal and said unidirectional poential will be applied to said diode, said diode providing an output circuit from which said one signal component may be obtained.

References Cited in the file of this patent

UNITED STATES PATENTS

| | | |
|---|---|---|
| 2,141,343 | Campbell | Dec. 27, 1938 |
| 2,408,079 | Labin et al. | Sept. 24, 1946 |
| 2,419,548 | Grieg | Apr. 29, 1947 |
| 2,428,011 | Chatterjea et al. | Sept. 30, 1947 |
| 2,434,922 | Grieg | Jan. 27, 1948 |
| 2,540,512 | Crosby | Feb. 6, 1951 |
| 2,541,039 | Cole | Feb. 13, 1951 |
| 2,577,147 | Oberman et al. | Dec. 4, 1951 |
| 2,609,501 | Guthrie | Sept. 2, 1952 |